United States Patent [19]

Horiike et al.

[11] Patent Number: 5,060,749

[45] Date of Patent: Oct. 29, 1991

[54] MOTORCYCLE

[75] Inventors: Satoru Horiike, Tokyo; Toshiteru Yamamoto, Saitama; Eiji Hamano, Tokyo, all of Japan

[73] Assignee: Honda Giken Kogyo Kabushiki Kaisha, Tokyo, Japan

[21] Appl. No.: 560,254

[22] Filed: Jul. 31, 1990

Related U.S. Application Data

[63] Continuation of Ser. No. 327,451, Mar. 22, 1989, abandoned.

[30] Foreign Application Priority Data

Mar. 30, 1988 [JP] Japan .................................. 63-74491

[51] Int. Cl.⁵ ............................................ B62D 61/02
[52] U.S. Cl. .................................................. 180/219
[58] Field of Search ............... 180/219, 277, 215, 213, 180/210; 280/282

[56] References Cited

U.S. PATENT DOCUMENTS

| 3,912,031 | 10/1975 | Goulet | 180/9.26 |
| 3,938,609 | 2/1976 | Kensaku et al. | 180/27 |
| 4,448,436 | 5/1984 | Ohzono | 28/282 |
| 4,460,057 | 7/1984 | Kohyama | 180/210 |
| 4,541,501 | 9/1985 | Kawasaki | 180/215 |
| 4,666,018 | 5/1987 | Shibuya | 180/213 |

FOREIGN PATENT DOCUMENTS 2583704 12/1986 France .

Primary Examiner—Andres Kashnikow
Assistant Examiner—Richard Camby
Attorney, Agent, or Firm—Armstrong, Nikaido, Marmelstein, Kubovcik, & Murray

[57] ABSTRACT

According to the present invention, with a motorcycle in which only the front frame banks and the main frame is prevented from banking, the connecting shaft, between the front frame and the main frame, is arranged and provided under a line connecting centers of the front and rear wheels so that a rotating center of the front frame for banking may be located in a lower position to lower the center of gravity of the vehicle.

2 Claims, 3 Drawing Sheets

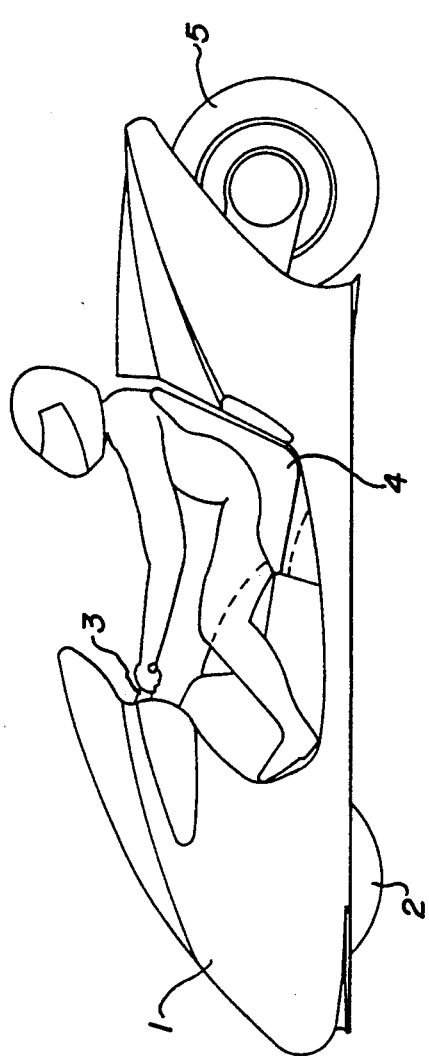
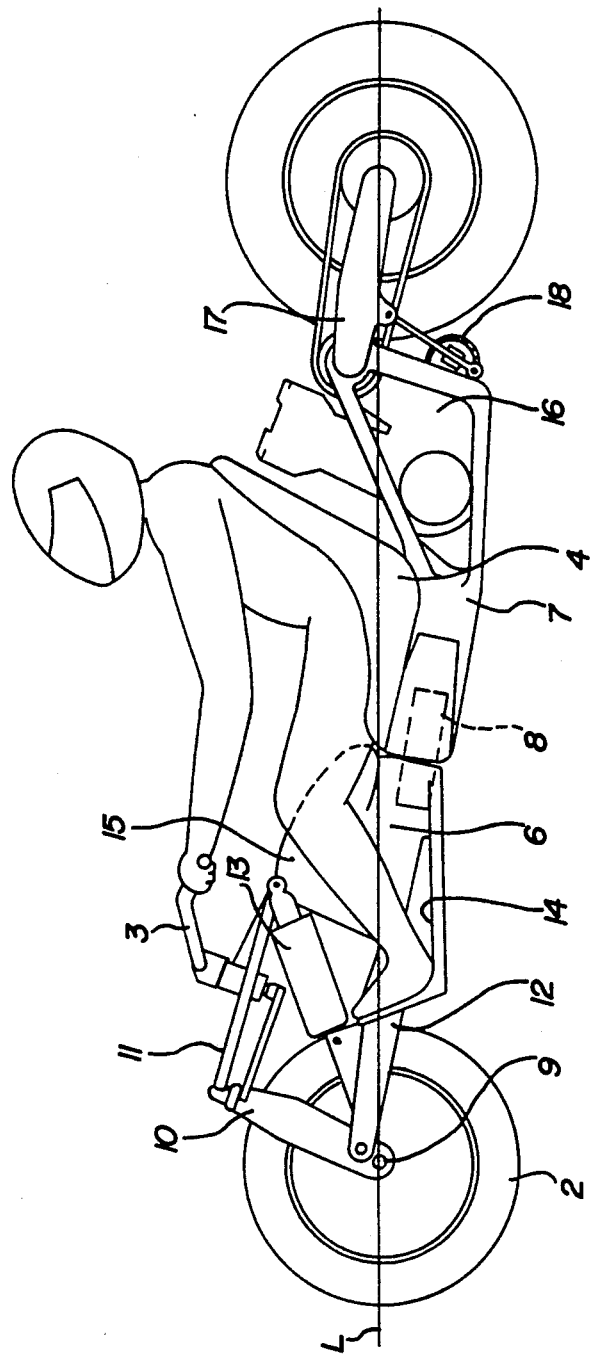
FIG. 1
FIG. 2

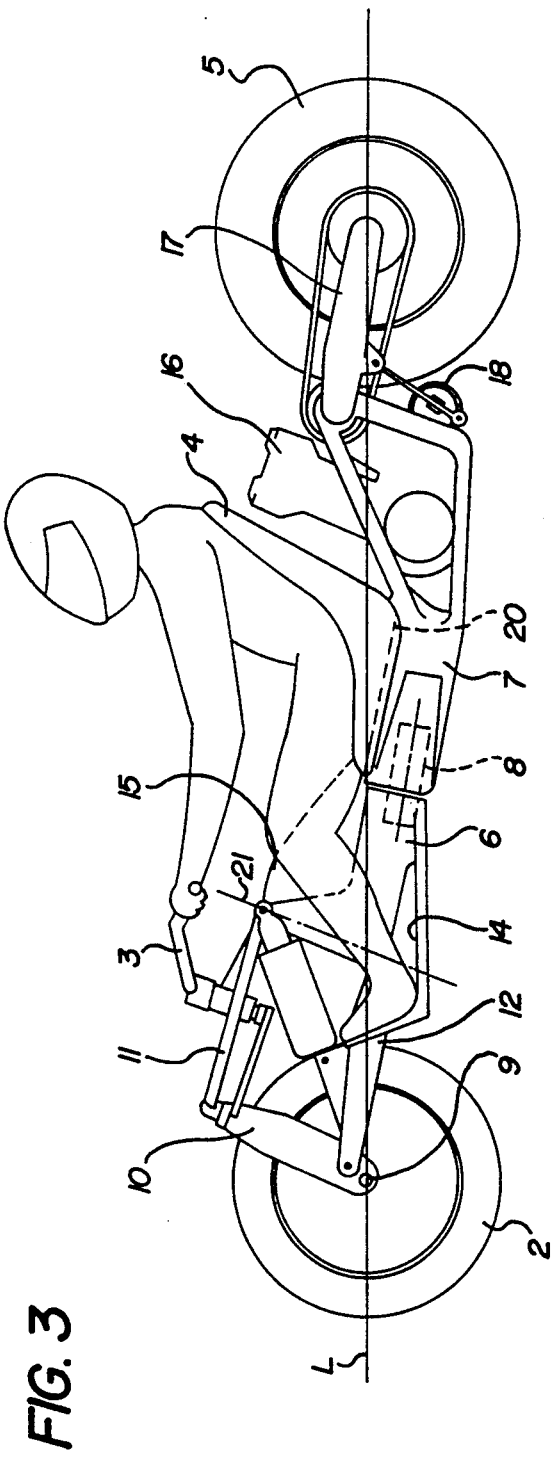
FIG. 3
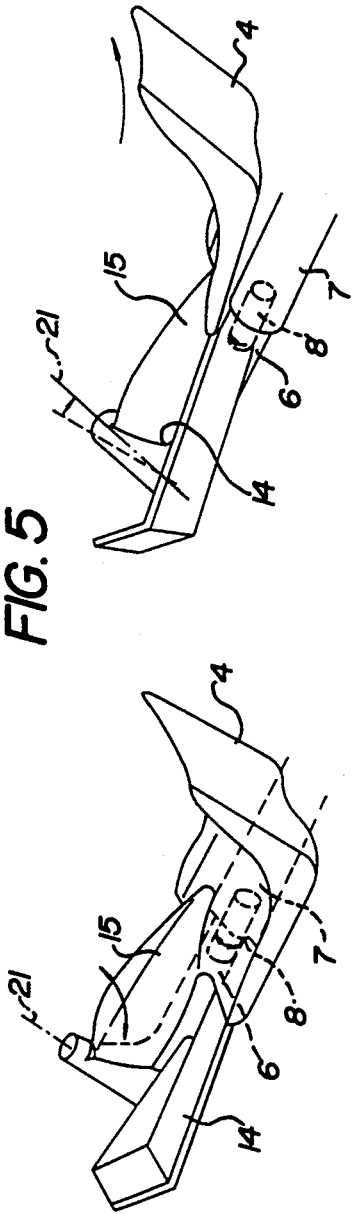
FIG. 5
FIG. 4

MOTORCYCLE

This application is a continuation of application Ser. No. 327,451 filed Mar. 22, 1989 now abandoned.

FIELD OF THE INVENTION

The present invention relates to a motorcycle.

BACKGROUND OF THE INVENTION

In the prior art, when a motorcycle corners, the vehicle body is balanced against a centrifugal force, generated by weight, vehicle speed, and corning radius, by permitting the vehicle body to bank. Due to the bank of the vehicle body, the front and rear wheels have a reduced ground contact area. In addition, the running speed of the vehicle must be reduced when cornering.

A motorcycle has been proposed which can corner at a high speed such as used during racing or the like. In this proposed motorcycle, the vehicle body frame comprises a front frame suspending a front wheel having a round tire and a main frame suspending a rear wheel having a flat tire. The respective frames are connected to each other in front and rear directions. The front frame is rotatable about a connecting shaft between the front frame and the main frame. The rear wheel is wide enough to prevent rotation of the main frame about the connecting shaft.

With this motorcycle, high speed cornering is accomplished by balancing between a centrifugal force, generated on cornering, and a centripetal force, generated by banking the front frame to a side of the vehicle body and, at the same time, by increasing a gripping force of the rear wheel, as a driving wheel, which is supported on the bank prevented main frame.

However, in order to further increase cornering performance at high speed, it is desirable to lower the center of gravity of the vehicle body to lessen the centrifugal force created during cornering.

SUMMARY OF THE INVENTION

It is the object of the present invention to provide a motorcycle which is able to lower the center of gravity of a vehicle body thereby to enable higher speed cornering.

In order to attain this objective, the present invention provides a motorcycle comprising a vehicle body frame including a front frame suspending a front wheel and a main frame suspending a rear wheel. The front and main frames are connected in front and rear directions. The front frame is capable of banking to a side of the vehicle body about a connecting shaft extending between the front frame and the main frame. The rear wheel prevents the main frame from banking about the connecting shaft. The connecting shaft is arranged and provided to be lower than a line connecting each center of the front and rear wheels. A seat is provided on the front frame immediate above the connecting shaft. Steps are provided on both sides of the front frame in front of the seat.

The present invention also provides a motorcycle comprising a vehicle body frame including a front frame suspending a front wheel and a main frame suspending a rear wheel. The front and main frames are connected in front and rear directions. The front frame is able to bank on a side of the vehicle body about a connecting shaft extending between the front frame and the main frame. The rear wheel prevents banking of the main frame about the connecting shaft. A front of a seat frame is swingably mounted on a mounting shaft which is provided on the front frame substantially in upper and lower directions of the vehicle body. The connecting shaft is arranged and provided to be lower than a line connecting each center of the front and rear wheels. A seat is provided on the front frame immediately about the connecting shaft. Steps are provided on both sides of the front frame in front of the seat.

The present invention further provides a motorcycle comprising a vehicle body frame including a front frame suspending a front wheel and a main frame suspending a rear wheel. The front and main frames are connected in front and rear directions. The front frame is able to bank to a side of the vehicle body about a connecting shaft extending between the front frame and the main frame. The rear wheel prevents banking of the main frame about the connecting shaft. A front of a seat frame is swingably mounted on a mounting shaft which is provided on the front frame substantially in upper and lower directions of the vehicle body. The connecting shaft is arranged and provided to be lower than a line connecting each center of the front and rear wheels. A seat is provided on the seat frame immediately above the connecting shaft. Steps are provided on the seat frame in front of the seat.

According to the present invention, with a motorcycle in which only the front frame banks and the main frame is prevented from banking, the connecting shaft, between the front frame and the main frame, is arranged and provided under a line connecting centers of the front and rear wheels so that a rotating center of the front frame for banking may be located in a lower position. Also, since the seat banks immediately above the connecting shaft together with the front frame, a center of gravity of the whole vehicle body, including the driver, may be lowered.

Since the steps are provided in the front of the seat, the driver may take up a riding position in which both feet extend forward, thereby enabling the motorcycle to be steered at a lower position. When the seat frame is swingably provided on the front frame, the swinging position of the seat frame can be lowered. As a result, high speed cornering becomes possible by decreasing the amount of centrifugal force which occurs during cornering and, therefore, reduces the amount of banking needed to obtain a centripetal force which opposes the centrifugal force.

BRIEF DESCRIPTION OF THE DRAWINGS:

The drawings show examples realizing the present invention in which:

FIG. 1 is a side view;

FIG. 2 is a side view showing an internal structure of the embodiment of FIG. 1;

FIG. 3 is a side view showing an internal structure of another embodiment of the present invention;

FIGS. 4 and 5 are perspective views explaining bank conditions of a vehicle body on cornering in the embodiment shown in FIG. 3.

DESCRIPTION OF THE PREFERRED EMBODIMENTS

Figure 6:
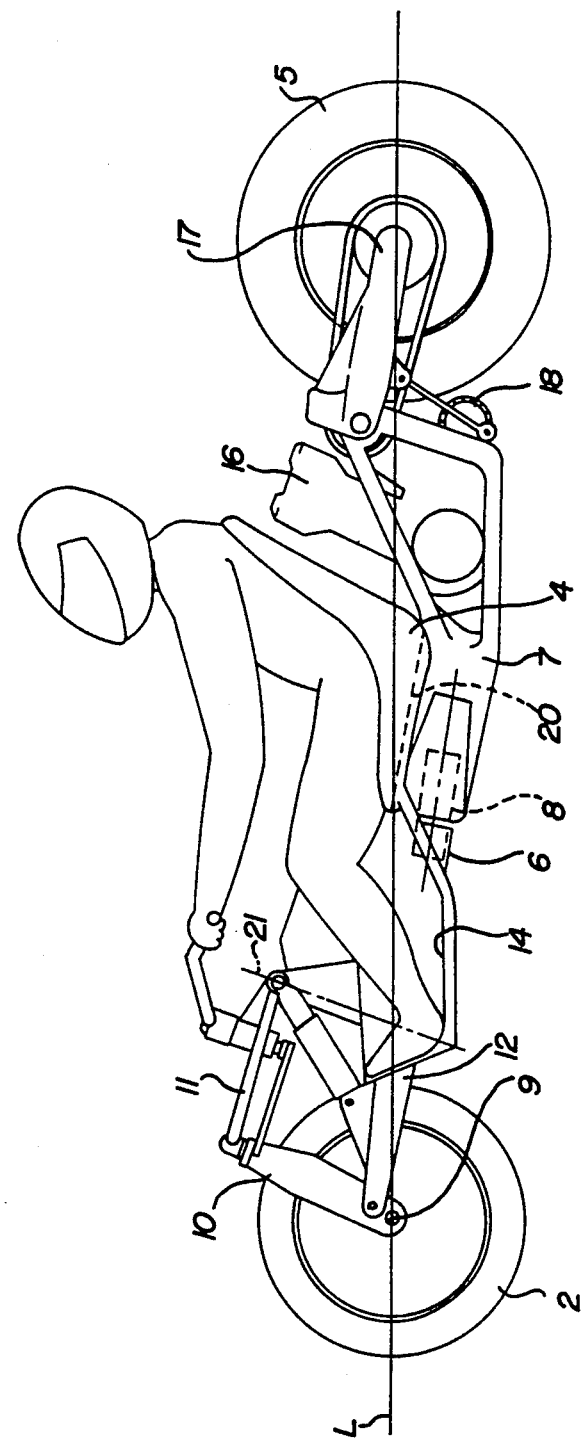
FIG. 6 is a side view showing an internal structure of a further embodiment according to the present invention.

One embodiment of the present invention will be described below in detail with reference to the drawings. FIG. 1 is a side view showing the present invention. A vehicle body cover 1 covers an outer periphery of a vehicle body. A front wheel 2 of a round tire is suspended on a front frame as described hereinafter. A front wheel steering handle 3 is provided on the front frame. A seat 4 is provided on the front frame. A rear wheel 5, as a driving wheel of a flat tire, is suspended on a main frame as described hereinafter.

The internal structure of the vehicle body cover 1 according to the present invention will be explained in detail with reference to FIG. 2.

In FIG. 2, a front frame 6 suspends the front wheel 2. A main frame 7 suspends the rear wheel 5. A connecting shaft 8 connects the front frame 6 with the main frame 7 in front and rear directions. The connecting shaft 8 is arranged at a position which is lower than an imaginary line connecting each center of the front wheel 2 and the rear wheel 5. The connecting shaft 8 extends forward and upward. The connecting shaft 8 is supported by the main frame 7 and is rotatable at the front frame 6. Alternatively, the connecting shaft 8 may be supported on the front frame 6 so as to rotate relative to the main frame 7. A seat surface of the seat 4 extends along the connecting shaft 8.

Since the rear wheel 5 is provided with a wide and flat tire, the main frame 7 is prevented from banking to either side of the vehicle body. Only the front frame 6 is capable of banking by rotating about the connecting shaft 8.

The front wheel 2 is suspended on a steering stem 10 through the intermediary of a wheel axle 9. On upper and lower portions of the steering stem 10 are swingably provided front end portions of swing arms 11 and 12. Rear end portions of the swing arms 11 and 12 are pivoted on the front frame 6 by means of pins extending in a width direction of the vehicle. A damper 13 is interposed between the lower swing arm 12 and the front frame 6, and the front wheel 2 is suspended on the front frame 6. On the front frame 6, a driver's seat 4 extends immediately above the connecting shaft 8. The driver's seat 4 is integral with the front frame 6. Steps 14 are integrally provided on front opposite sides of the seat 4. The seat 4 and the steps 14 are able to bank about the connecting shaft 8 together with the front frame 6. A tool housing 15 is provided on the front frame 6.

On the main frame 7, between the seat 4 and the rear wheel 5, a power unit 16 of an engine or the like is mounted. The power unit 16 drives the rear wheel 5 through the intermediary of a chain. The rear wheel 5 is suspended by means of a swing arm 17 swingably provided on a rear end of the main frame. The swing arm 17 is supported by means of a rear damper 18.

Operations of the above embodiment will next be explained in detail, particularly with respect to cornering.

Upon cornering, when the driver's balance is deflected in left and right directions to the vehicle body toward the banking side to allow the vehicle body to bank, the main frame 7 does not bank, while the front frame 6 banks about the connecting shaft 8 together with the seat 4 and the steps 14.

At this time, the connecting shaft 8, for connecting the front frame 6 with the main frame 7, is arranged and provided under the imaginary line "L" which connects the centers of the front and rear wheels 2, 5. The center of the front frame 6, when rotated relative to the bank angle, is at a position which is lower than line "L". Similarly, the driver on the seat 4 and the steps 14, when banked, are at a lower position immediately above the connecting shaft 8. Accordingly, the center of gravity of the whole vehicle body, including the driver, is lowered. Thus, the centrifugal force which occurs during cornering is reduced. Further, the connecting shaft 8 is inclined, with respect to a ground contact point of the rear wheel 5, to the banking side of the front frame 6. At the same time, the rear wheel 5 is directed in the cornering direction to apply its driving force in the cornering direction, while the driver banks together with the front frame 6. With these conditions, cornering occurs with only a small amount of bank.

Since the wide rear wheel 5, as a driving wheel, does not bank and ensures a sufficient ground contact area upon cornering, the driving force of the rear wheel 5 is effectively utilized. Also, when banking, since the reduction of the ground contact area derived from banking is prevented at the front wheel 2, high speed cornering becomes possible.

The driver can perform the banking movement while remaining seated in the seat 4, where the seat 4 is in a lower than normal position immediately about the connecting shaft 8 as shown in FIG. 2. The driver's knees can grip the tool housing 15 and the driver's feet can either extend in a free manner, or the driver's feet can rest on the steps 14. The riding position upon cornering is thus easily assumed.

FIG. 3 shows an internal structure of another embodiment of the present invention. The structure is basically the same as that of the embodiment shown in FIG. 2. In this embodiment, a seat frame 20 extends from the front frame 6 rearwardly of the vehicle body. The seat frame 20 is mounted on the front frame 6 by means of a mounting shaft 21 extending in up and down directions of the vehicle body. Thus, the seat frame 20 is swingable sidewardly of the vehicle. The remaining structure is like that in the embodiment of FIG. 2. The like reference numerals in FIGS. 1 and 2 are given to like parts in FIG. 3 and the explanation relative to the corresponding structure will be omitted, accordingly.

A driver's seat 4 is provided at a position immediately above the connecting shaft 8 of the seat frame 20. The driver steers the motorcycle while sitting on the seat 4 which is immediately above the connecting shaft 8 as shown in FIG. 3. The driver's feet rest on the steps 14 provided on each forward lateral side of the front frame 6, in front of the seat 4.

The operation of this embodiment, particularly on cornering, will be explained in detail hereunder.

Upon cornering, when the driver's balance is deflected in left and right directions to the vehicle body toward the banking side to allow the vehicle body to bank, the main frame 7 does not bank, while the front frame 6 banks about the connecting shaft 8. The seat frame 20 banks from a condition shown in FIG. 4 to a condition as shown in FIG. 5 so as to swing about the mounting shaft 21. Then, the seat 4 is swung in the same direction as the bank.

In the above described manner, this embodiment performs the same function and effective feature as the embodiment shown in FIG. 2. In addition, since the seat frame 20 and the seat 4 swing to the lateral side of the vehicle body thereby to balance the centrifugal force occurring during cornering, cornering will occur with a smaller amount of bank. The ground contact area of the front wheel, therefore, is further reduced so that cornering may be effected at a higher speed.

FIG. 6 shows a further embodiment of the present invention, wherein the structure is basically the same as that of the embodiment shown in FIG. 2. In this embodiment, a seat frame 20 extends from the front frame 6 rearward of the vehicle body. The seat frame 20 is mounted on the front frame 6 by means of a mounting shaft 21 extending in up and down directions of the vehicle body so that the seat frame 20 is swingable sidewardly of the vehicle body. Steps 14 are provided on the seat frame 20. A driver's seat 4 is provided on the seat frame 20 at a position immediately above the connecting shaft 8, and further steps 14 are provided on the seat frame 20 in front of the seat 4. The remaining structure corresponds to the embodiment of FIG. 2. Accordingly, the same structures in FIG. 6 that are in FIGS. 1 and 2 are not explained, while giving like reference numerals to like parts.

The following description is made in detail with respect to the operation of the vehicle, particularly during cornering using this embodiment.

When cornering, if the driver's balance is deflected in left and right directions toward the bank side in order to allow the vehicle body to bank, the main frame 7 does not bank but the front frame 6 banks about the connecting shaft 8. The seat frame 20 also banks and, at the same time, swings about the mounting shaft 21, thereby allowing the seat 4 and the steps 14 to swing in the same direction as the bank.

Thus, this embodiment performs the function and effect similar to those in the embodiment shown in FIG. 2. In addition, since the seat frame 20, the seat 4, and the steps 14 swing to the side of the vehicle body and are intended to balance the centrifugal force which occurs on cornering, cornering becomes possible with a smaller amount of bank. Accordingly, since the reduction of the ground contact area of the front wheel is more effectively prevented, higher cornering speeds become possible.

According to the present invention, in the motorcycle in which only the front frame banks but the main frame is prevented from banking, cornering can be effected with a smaller amount of bank with respect to the front frame and higher speed cornering is possible by preventing the reduction of ground contact area of the front wheel.

From the foregoing description of the preferred embodiment of the invention, it will be apparent that many modifications may be made therein. It should be understood that these embodiments are intended as one example of the invention only, and that the invention is not limited thereto. Therefore, it should be understood that the appended claims are intended to cover all modifications that fall within the true spirit and scope of the invention.

What is claimed is:

1. A motorcycle comprising:
   a front wheel having an axis of rotation;
   a rear wheel having an axis of rotation;
   a vehicle body frame including
      a front frame suspending said front wheel,
      a main frame suspending said rear wheel, wherein said front and main frames are connected in front and rear directions,
      a connecting shaft extending between said front frame and said main frame, the front frame being able to bank to a side of the vehicle body about said connecting shaft, said rear wheel preventing said main frame from banking about said connecting shaft, said connecting shaft is arranged and disposed at a position lower than each axis of rotation of said front and rear wheels,
   a seat frame,
   a mounting shaft provided on said front frame extending in substantially upper and lower directions of the vehicle body, a front of said seat frame being swingably mounted on said mounting shaft,
   a seat provided on said front frame immediately above said connecting shaft, and
   steps provided on lateral sides of a front portion of said front frame in front of said seat.

2. A motorcycle comprising:
   a front wheel having an axle;
   a rear wheel having an axle;
   a vehicle body frame including
      a front frame suspending said front wheel,
      a main frame suspending said rear wheel, wherein said front and main frames are connected in front and rear directions,
      a connecting shaft extending between said front and main frames, said front frame being able to bank to a side of the vehicle body about said connecting shaft, said rear wheel preventing said main frame from banking about said connecting shaft, said connecting shaft is arranged and disposed at a position lower than each axle of said front and rear wheels,
   a seat frame,
   a mounting shaft provided on said front frame extending substantially in upper and lower directions of the vehicle body, a front of said seat frame swingable mounted on said mounting shaft,
   a seat provided on said seat frame immediately above said connecting shaft, and
   steps are provided on said seat frame in front of said seat.

* * * * *